United States Patent
Alexandrov et al.

(10) Patent No.: US 11,042,399 B2
(45) Date of Patent: *Jun. 22, 2021

(54) MANAGING VIRTUAL COMPUTING INSTANCES AND PHYSICAL SERVERS

(71) Applicant: VMware, Inc., Palo Alto, CA (US)

(72) Inventors: Asen Alexandrov, Sofia (BG); Danail Grigorov, Sofia (BG); Ilko Dragoev, Sofia (BG); Ivan Strelkov, Sofia (BG); Emil Gelev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,902

(22) Filed: Nov. 27, 2019

(65) Prior Publication Data
US 2020/0097318 A1 Mar. 26, 2020

Related U.S. Application Data

(63) Continuation of application No. 15/655,240, filed on Jul. 20, 2017, now Pat. No. 10,496,429.

(51) Int. Cl.
*G06F 9/455* (2018.01)
*G06F 9/50* (2006.01)
*H04L 29/08* (2006.01)
*H04L 12/24* (2006.01)

(52) U.S. Cl.
CPC ........ *G06F 9/45558* (2013.01); *G06F 9/5077* (2013.01); *H04L 41/0806* (2013.01); *H04L 41/22* (2013.01); *H04L 67/04* (2013.01); *G06F 9/5083* (2013.01)

(58) Field of Classification Search
None
See application file for complete search history.

(56) References Cited

U.S. PATENT DOCUMENTS

| | | | |
|---|---|---|---|
| 8,296,762 B2 | 10/2012 | Knauerhase et al. | |
| 8,549,123 B1 | 10/2013 | Wilkinson et al. | |
| 9,037,843 B2 | 5/2015 | Lyons et al. | |
| 9,262,227 B2 | 2/2016 | Doi | |
| 9,396,004 B1 * | 7/2016 | Bester | G06F 9/45533 |
| 9,762,661 B1 * | 9/2017 | Kaplan | G06F 9/45558 |
| 9,959,214 B1 * | 5/2018 | Habusha | G06F 3/0604 |
| 10,133,593 B1 * | 11/2018 | Sethuramalingam | G06F 9/45558 |
| 10,496,429 B2 | 12/2019 | Alexandrov et al. | |

(Continued)

OTHER PUBLICATIONS

United States Patent and Trademark Office, "Non-Final Office Action," issued in connection with U.S. Appl. No. 15/655,240, dated Feb. 14, 2019, 11 pages.

(Continued)

*Primary Examiner* — Isaac T Tecklu
(74) *Attorney, Agent, or Firm* — Hanley, Flight & Zimmerman, LLC (57) ABSTRACT

The present disclosure is related to managing virtual computing instances and physical servers. An example machine-readable medium may store instructions executable by a processing resource to cause a computer system to provide an application program interface (API) that provides a user with an ability to manage a virtual computing instance (VCI) deployed on a hypervisor and provisioned by a pool of physical computing resources and manage a physical server.

20 Claims, 4 Drawing Sheets

(56) References Cited

U.S. PATENT DOCUMENTS

| | | |
|---|---|---|
| 2008/0201479 A1 | 8/2008 | Husain et al. |
| 2009/0276484 A1* | 11/2009 | Polastre .................. H04L 69/08 |
| | | 709/202 |
| 2010/0083015 A1* | 4/2010 | Yokota .................. G06F 9/5027 |
| | | 713/310 |
| 2010/0199351 A1 | 8/2010 | Protas |
| 2011/0004680 A1 | 1/2011 | Ryman |
| 2011/0099428 A1* | 4/2011 | Stenberg .............. H04Q 3/0075 |
| | | 714/37 |
| 2012/0254861 A1* | 10/2012 | Down, Jr. .................. G06F 8/63 |
| | | 718/1 |
| 2013/0067465 A1* | 3/2013 | Fuhrman .............. G06F 9/5077 |
| | | 718/1 |
| 2013/0219030 A1* | 8/2013 | Szabo ..................... G06F 8/656 |
| | | 709/221 |
| 2013/0332610 A1 | 12/2013 | Beveridge |
| 2014/0013325 A1* | 1/2014 | Shimoni ............... G06F 21/575 |
| | | 718/1 |
| 2014/0047439 A1 | 2/2014 | Levy et al. |
| 2014/0108775 A1* | 4/2014 | Kludy .................. G06F 9/45558 |
| | | 713/2 |
| 2014/0196038 A1* | 7/2014 | Kottomtharayil ....... G06F 9/505 |
| | | 718/1 |
| 2014/0245296 A1 | 8/2014 | Sethuramalingam et al. |
| 2014/0250439 A1 | 9/2014 | Parashar et al. |
| 2014/0331225 A1 | 11/2014 | Helander et al. |
| 2014/0344805 A1* | 11/2014 | Shu ..................... G06F 9/45558 |
| | | 718/1 |
| 2014/0372788 A1 | 12/2014 | Vavrick et al. |
| 2015/0026676 A1* | 1/2015 | Makin ..................... G06F 9/505 |
| | | 718/1 |
| 2015/0128052 A1* | 5/2015 | Grehan ............... G06F 9/45558 |
| | | 715/735 |
| 2015/0154039 A1* | 6/2015 | Zada .................... G06F 9/5011 |
| | | 718/1 |
| 2015/0154046 A1 | 6/2015 | Farkas et al. |
| 2015/0236977 A1 | 8/2015 | Terayama et al. |
| 2016/0011900 A1 | 1/2016 | Reddy et al. |
| 2016/0124665 A1 | 5/2016 | Jain et al. |
| 2016/0127509 A1* | 5/2016 | Uriel .................... H04L 61/2015 |
| | | 709/203 |
| 2016/0188356 A1* | 6/2016 | Ramasamy ......... G06F 9/45533 |
| | | 718/1 |
| 2016/0246692 A1* | 8/2016 | Kaplan ................. G06F 11/203 |
| 2016/0253195 A1 | 9/2016 | Banzhaf et al. |
| 2016/0337226 A1* | 11/2016 | Padala .................. G06N 20/00 |
| 2016/0350143 A1* | 12/2016 | Uliel .................... G06F 9/5077 |
| 2016/0364304 A1 | 12/2016 | Hanumantharaya et al. |
| 2017/0003992 A1 | 1/2017 | Farkas et al. |
| 2017/0116014 A1 | 4/2017 | Yang et al. |
| 2017/0123836 A1* | 5/2017 | Nagy ...................... G06F 9/455 |
| 2017/0153907 A1* | 6/2017 | Grover ................ G06F 9/45558 |

OTHER PUBLICATIONS

United States Patent and Trademark Office, "Notice of Allowance," issued in connection with U.S. Appl. No. 15/655,240, dated Jul. 22, 2019, 15 pages.

* cited by examiner

MANAGING VIRTUAL COMPUTING INSTANCES AND PHYSICAL SERVERS

RELATED APPLICATION

This patent arises from a continuation of U.S. patent application Ser. No. 15/655,240, (Now U.S. Pat. No. 10,496, 429) which was filed on Jul. 20, 2017. U.S. patent application Ser. No. 15/655,240 is hereby incorporated herein by reference in its entirety. Priority to U.S. patent application Ser. No. 15/655,240 is hereby claimed.

BACKGROUND

Virtual computing instances (VCIs), such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.).

DETAILED DESCRIPTION

The term "virtual computing instance" (VCI) covers a range of computing functionality. VCIs may include virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

Multiple VCIs can be configured to be in communication with each other in a software defined data center. In such a system, information can be propagated from an end user to at least one of the VCIs in the system, between VCIs in the system, and/or between at least one of the VCIs in the system and a non-virtualized physical server.

Software defined data centers are dynamic in nature. For example, VCIs and/or various application services, may be created, used, moved, or destroyed within the software defined data center. When VCIs are created (e.g., when a container is initialized), various processes and/or services start running and consuming resources. As used herein, "resources" are physical or virtual components that have a finite availability within a computer or software defined data center. For example, resources include processing resources, memory resources, electrical power, and/or input/output resources, etc.

In some approaches, when deploying a new infrastructure to one or more components in a software defined data center, administrators may have to manually install virtualization platforms and/or utilize out-of-band management solutions provided by hardware vendors. However, this may consume a lot of time and/or resources to get the virtual environment ready for use.

In contrast, embodiments described herein may allow for physical servers (e.g., non-virtualized physical servers) to be managed through the same application programming interface (API) and/or user interface as one or more VCIs in the software defined data center. This may reduce the amount of time and/or resources used to provision a functioning software defined data center environment. In addition, the ability to manage physical servers and VCIs using the same API and/or user interface may be more convenient for an administrator because information regarding both the physical server and the VCI may be presented concurrently to the administrator. In some embodiments, the information regarding both the physical server and the VCI may be presented concurrently in a single API or user interface window. Further, the ability to manage physical servers and VCIs using the same API and/or user interface may make debugging of otherwise difficult to find issues in the software defined data center, such as hypervisor failures, easier to recognize and identify. Moreover, the ability to manage physical servers and VCIs using the same API and/or user interface may allow a user or administrator to utilize a single set of permissions (e.g., credentials).

In some embodiments, one or more VCIs and/or hypervisors in a software defined data center may be managed using a centralized virtual server application. The centralized virtual server application may include a host gateway that may act as a smart proxy to pipe management and/or data traffic to one or more VCIs and/or hypervisors. The host gateway may be configured to act as a translation layer to third-party hypervisors (e.g., hypervisors that are made by a different party than the VCIs and/or virtualized server application). In addition, the host gateway may aggregate management and/or data traffic, and may present components of the software defined data center that are not in fact hosts as if they are. One such example is that the host gateway may be configured to present a physical server (e.g., a physical machine without an operating system, bare metal server, etc.) as a host regardless of whether the physical server is in fact a host. In some embodiments, VCIs can use computing resources provided by a host. The host may be a physical server on which a hypervisor is installed to partition the physical resources among VCIs. In the case of containers, a module in the operating system kernel partition may partition operating resources among containers. As used herein, a "host" refers to any kind of entity on which a VCI may be provisioned.

In some embodiments, an API or user interface associated with controlling the host gateway and/or a centralized virtual server application may be used to manage VCIs and physical servers concurrently. For example, the physical server may be managed via an intelligent platform management interface (IPMI) and may be presented as a managed host via the API and/or a user interface. In some embodiments, media images (e.g., an ISO image) may be mounted to the physical server by asserting commands via the IPMI and/or the physical server may be powered on, off, or rebooted via the IPMI.

The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. A group or plurality of similar elements or components may generally be referred to herein with a single element number. For example a plurality of reference elements 106-1, 106-2, . . . , 106-N may be referred to generally as 106. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Embodiments of the present disclosure are directed to managing virtual computing instances and physical servers, for example, in the context of a software defined data center (e.g., a distributed computing environment) including one or more VCIs and/or hosts. In some embodiments, an example machine-readable medium may store instructions executable by a processing resource to cause a computer system to provide an application program interface (API) that provides a user with an ability to manage a virtual computing instance (VCI) deployed on a hypervisor and provisioned by a pool of physical computing resources and manage a physical server.

Figure 1:
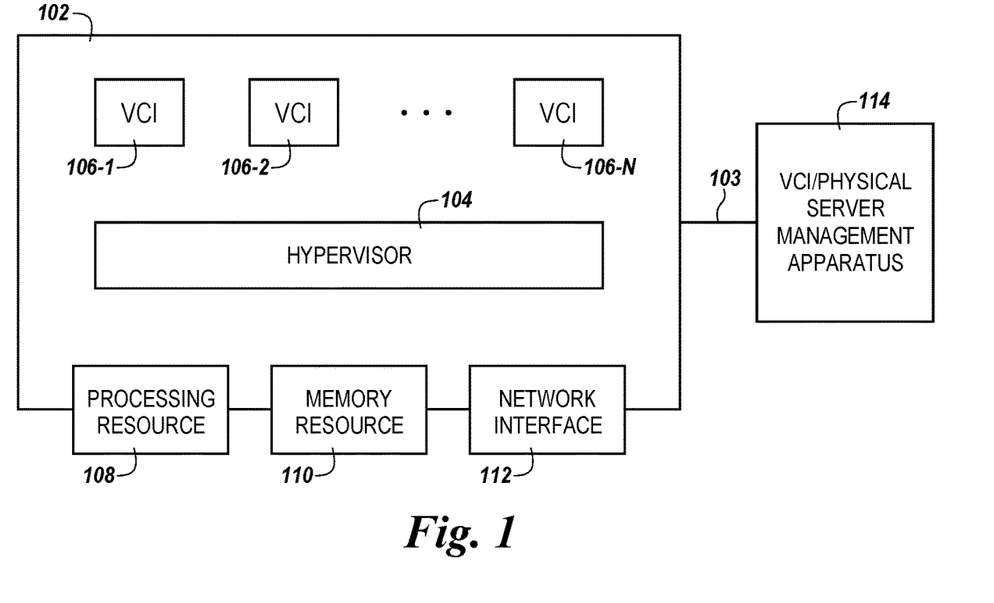
FIG. 1 is a diagram of a host for managing VCIs and physical servers according to the present disclosure.

FIG. 1 is a diagram of a host 102 for managing VCIs and physical servers according to the present disclosure. The system can include a host 102 with processing resources 108 (e.g., a number of processors), memory resources 110 (e.g., main memory devices and/or storage memory devices), and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and are not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106.

The host 102 may be in communication with a VCI/physical server management apparatus 114 via a data path 103. In some embodiments, the VCI/physical server management apparatus 114 can be configured to facilitate management of VCIs 106 and one or more physical servers (e.g., physical server 444 illustrated in FIG. 4). For example, the VCI/physical server management apparatus 114 can be configured to provide an ability to manage VCIs 106 and one or more physical servers via an API and/or a user interface such as a graphical user interface. In some embodiments, the VCI/physical server management apparatus 114 can be deployed on (e.g., may be running on) the host 102, and/or one or more of the VCIs 106. In some embodiments, the VCI/physical server management apparatus 114 can be deployed on the host 102 or a VCI (e.g., VCI 106-1), which may be the only host 102 or VCI (e.g., VCI 106-1) that is running or is provisioned with a pool of computing resources. However, in some embodiments, the VCI/physical server management apparatus 114 may be deployed across multiple hosts and/or VCIs, for example hosts and/or VCIs not specifically illustrated in FIG. 1.

In some embodiments, the VCI/physical server management apparatus 114 can include a combination of software and hardware, or the VCI/physical server management apparatus 114 can include software and can be provisioned by processing resource 108. An example of a VCI/physical server management apparatus 114 is illustrated and described in more detail with respect to FIG. 2.

Figure 2:
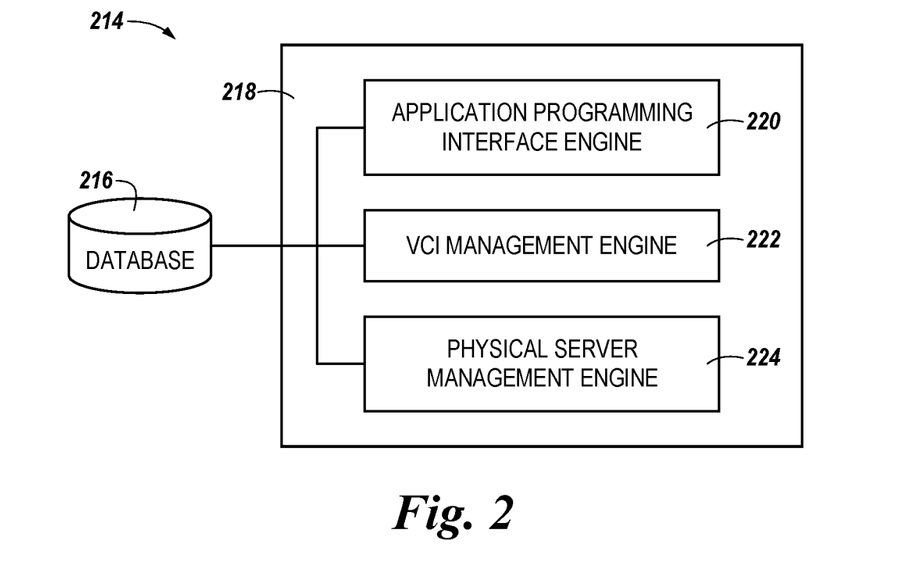
FIG. 2 is a diagram of a system for managing VCIs and physical servers according to the present disclosure.

FIG. 2 is a diagram of an apparatus for managing VCIs and physical servers according to the present disclosure. The apparatus 214 can include a database 216, a subsystem 218, and/or a number of engines, for example an application programming interface (API) engine 220, a VCI management engine 222, and/or a physical server management engine 224. The engines 220, 222, 224 can be in communication with the database 216 via a communication link. The apparatus 214 can include additional or fewer engines than illustrated to perform the various functions described herein. The apparatus 214 can represent program instructions and/or hardware of a machine (e.g., machine 326 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines 220, 222, 224 can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the API engine 220 can include a combination of hardware and program instructions that can be configured to generate and provide an API or user interface for use by a user. The API or user interface may be configured to display information about VCIs and physical servers that are being managed. In some embodiments, the API or user interface may be provisioned with processing resources that are associated with a centralized virtual server application (e.g., centralized virtual server application 446 illustrated in FIG. 4 and centralized virtual server application 546 illustrated in FIG. 5). The centralized virtual server application may manage virtual resources (e.g., VCIs, etc.), however, the centralized virtual server application is not a virtual server itself (e.g., the centralized virtual server application runs on a physical host or server).

The API engine 220 can further be configured to generate a unified set of permissions for managing the VCIs and the physical server(s). For example, the API engine 220 can be configured to generate a single set of permissions that may allow a user to manage both the VCIs and the physical server(s) using a single set of credentials (e.g., log in credentials).

The VCI management engine 222 can be configured to provide management of VCIs in the software defined data center. In some embodiments, the VCI management engine 222 can be configured to provide information about management of the VCIs via the API or user interface generated by the API engine 220. The VCI management engine 222 can provide management of the VCIs by allowing configuration and management of networking resources, storage resources, and other resources utilized by the VCIs during operation.

The physical server management engine 224 can be configured to provide management of physical servers that are associated with the software defined data center. In some embodiments, the physical server management engine 224 can be configured to provide information about management of the physical server(s) via the API or user interface generated by the API engine 220. For example, the physical server management engine 224 can display the physical server as a managed host via the API or user interface. As discussed in more detail in connection with FIG. 4, herein, the physical server may not have an operating system installed thereon. In some embodiments, the physical server management engine 224 can be configured to provide management of the physical server(s) via an out-of-band management technology such as an intelligent platform management interface (IPMI) like IPMI 2.0, or any other suitable out-of-band management technology.

In addition to providing management of the physical server(s), the physical server management engine 224 may be configured to mount media images such as ISO images to the physical server(s). This may allow for software to be installed on the physical server(s) remotely via interaction with the API or user interface. In some embodiments, the physical server management engine 224 may be configured to power the physical server(s) on or off, or may be configured to restart the physical server(s). For example, the physical server management engine 224 may be configured to assert a command via the IPMI to the physical server(s) to power the physical server on or off, or the physical server management engine 224 may be configured to assert a command via the IPMI to the physical server(s) to restart the physical server(s). In some embodiments, the physical server management engine 224 can be configured to restart the physical server in response to a determination that one or more VCIs in the software defined data center have failed.

In some embodiments, the API or user interface may be configured to present a console associated with the physical host in addition to the consoles of other VCIs. The physical host may be displayed in the user interface as having a VCI running thereon despite the physical host not being a VCI. With the console of the physical host displayed in the user interface, the user may both observe the physical host console and input console commands to the physical host. This may allow for a user to input BIOS commands to the physical host to, for example, install and/or configure a hypervisor on the physical host. In some embodiments providing access to the console of the physical host (e.g., displaying the console of the physical host in the user interface) may be accomplished through use of kernel-based virtual machine capabilities provided, for example, via the IPMI.

Figure 3:
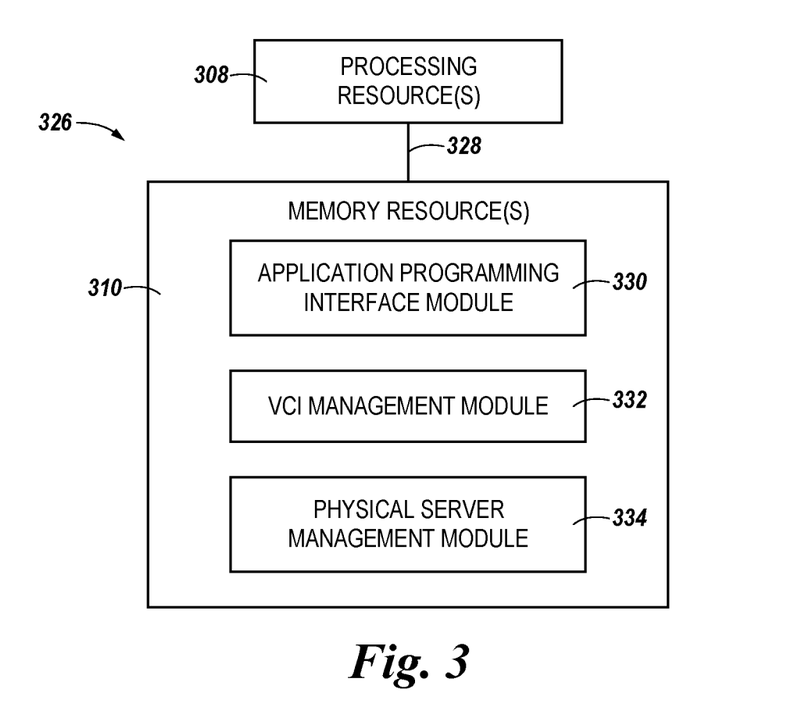
FIG. 3 is a diagram of a machine for managing VCIs and physical servers according to the present disclosure.

FIG. 3 is a diagram of a machine for managing VCIs and physical servers according to the present disclosure. The machine 326 can utilize software, hardware, firmware, and/or logic to perform a number of functions. The machine 326 can be a combination of hardware and program instructions configured to perform a number of functions (e.g., actions). The hardware, for example, can include a number of processing resource(s) 308 and a number of memory resource(s) 310, such as a machine-readable medium (MRM) or other memory resource(s) 310. The memory resource(s) 310 can be internal and/or external to the machine 326 (e.g., the machine 326 can include internal memory resources and have access to external memory resources). In some embodiments, the machine 326 can be a VCI, for example, the machine 326 can be a server. The program instructions (e.g., machine-readable instructions (MRI)) can include instructions stored on the MRM to implement a particular function (e.g., an action such as predicting application response time based on metrics). The set of MRI can be executable by one or more of the processing resource(s) 308. The memory resource(s) 310 can be coupled to the machine 326 in a wired and/or wireless manner. For example, the memory resource(s) 310 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resource(s) 310 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resource(s) 308 can be coupled to the memory resource(s) 310 via a communication path 328. The communication path 328 can be local or remote to the machine 326. Examples of a local communication path 328 can include an electronic bus internal to a machine, where the memory resource(s) 310 are in communication with the processing resource(s) 308 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 328 can be such that the memory resource(s) 310 are remote from the processing resource(s) 308, such as in a network connection between the memory resources 310 and the processing resources 308. That is, in some embodiments, the communication path 328 can be a network connection. Examples of such a network connection can include a local area network (LAN), wide area network (WAN), personal area network (PAN), and the Internet, among others.

As shown in FIG. 3, the MIll stored in the memory resource(s) 310 can be segmented into a number of modules 330, 332, and 334 that when executed by the processing resource(s) 308, can perform a number of functions. As used herein a module includes a set of instructions included to perform a particular task or action. The number of modules 330, 332, 334 can be sub-modules of other modules. For example, the VCI management module 332 can be a sub-module of the application programming interface module 330 and/or can be contained within a single module. Furthermore, the number of modules 330, 332, 334 can comprise individual modules separate and distinct from one another. Examples are not limited to the specific modules 330, 332, 334 illustrated in FIG. 3.

Each of the number of modules 330, 332, 334 can include program instructions and/or a combination of hardware and program instructions that, when executed by processing resource(s) 308, can function as a corresponding engine as described with respect to FIG. 2. For example, the application programming interface module 330 can include program instructions and/or a combination of hardware and program instructions that, when executed by processing resource(s) 308, can function as the application programming interface engine 220, the VCI management module 332 can include program instructions and/or a combination of hardware and program instructions that, when executed by processing resource(s) 308, can function as the VCI management engine 222, and/or the physical server management module 334 can include program instructions and/or a combination of hardware and program instructions that, when executed by processing resource(s) 308, can function as the physical server management engine 224.

Figure 4:
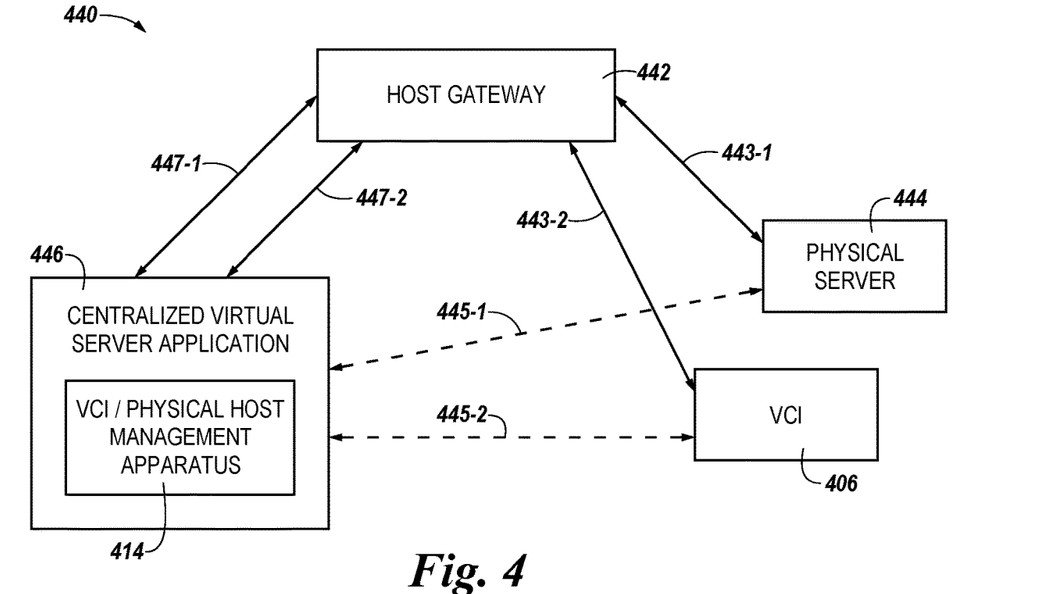
FIG. 4 is a diagram of a system for managing VCIs and physical servers according to the present disclosure.

FIG. 4 is a diagram of a system 440 for managing VCIs and physical servers according to the present disclosure. As shown in FIG. 4, the system 440 may include a host gateway 442, a physical server 444 (e.g., a non-virtualized physical server that does not have an operating system installed thereon, a non-virtualized physical server that has a general purpose operating system installed thereon that has crashed, a non-virtualized physical server that has a specialized operating system installed thereon that has crashed, etc.), VCI 406, and a centralized virtual server application 446. In some embodiments, the centralized virtual server application may include a VCI/physical server management apparatus 414. The VCI 406 may be running on a hypervisor as described in connection with FIG. 1. The host gateway 442 may be configured to provide a translation layer between the VCI 406 and the hypervisor in response to a determination that the hypervisor is a third-party hypervisor.

Data and/or management traffic may flow between the centralized virtual server application 446 and the physical server 444 and VCI 406 through the host gateway 442 as indicated by the solid lines 447-1 and 447-2, and 443-1 and 443-2. However, as described above, due to the host gateway 442 acting as a proxy for piping management and/or data traffic to the physical server 444 and/or VCI 406, the data and/or management traffic may appear to flow directly between the centralized virtual server application 446 and the physical server 444 and/or VCI 406, as indicated by the dashed lines 445-1 and 445-2.

Although not shown in FIG. 4, in some embodiments, the VCI/Physical host management apparatus 414 may be included with the host gateway 442. For example, the VCI/Physical host management apparatus 414 may reside in a VCI that is running the host gateway 442. In some embodiments, the host gateway 442 may provide API translation and/or console emulation that effectively "tricks" the centralized virtual server application 446 into thinking that it is managing a VCI 406 provisioned by a first-party hypervisor as opposed to a physical server 444. That is, because traffic to and from the physical server 444 may be routed through the host gateway 442, the physical host 444 may appear as a device that is provisioned by the hypervisor to the centralized virtual server application 446.

The centralized virtual server application 446 and/or VCI/physical server management apparatus 414 may be configured to provide management of the physical server 444 and the VCI 406. For example, the VCI/physical server management apparatus 414 can be configured to provide an API or user interface that provides a user with the ability to manage the VCI 406 and the physical server 444, as described above in connection with FIGS. 2 and 3. In some embodiments, the centralized virtual server application 446 may be configured to manage the physical server via an IPMI, as described above.

As described in more detail herein, the centralized virtual server application 446 may be configured to restart the physical server 444 in response to a determination that the VCI 406 has failed. For example, centralized virtual server application 446 may be configured to restart the physical server 444 in response to a determination that a management agent associated with the VCI 406 has failed. In some embodiments, the centralized virtual server application 446 may be configured to receive a heartbeat destined for the VCI 406 and relay the heartbeat to the VCI 406 as part of managing the VCI 406. This may allow for the centralized virtual server application 446 to keep track of the operating state of the VCI 406 as part of managing the VCI 406.

Figure 5:
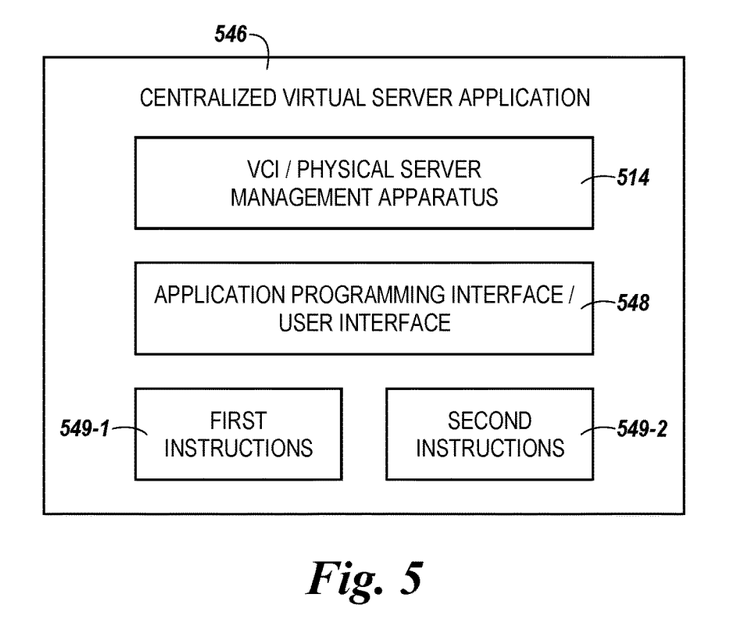
FIG. 5 is a diagram of a centralized virtual server application for managing VCIs and physical servers according to the present disclosure.

FIG. 5 is a diagram of a centralized virtual server application 546 for managing VCIs and physical servers according to the present disclosure. As shown in FIG. 5, the centralized virtual server application 546 may include a VCI/physical server management apparatus 514 and application programming interface/user interface 548.

The centralized virtual server application 546 may include first instructions 549-1 and second instructions 549-2. In some embodiments, first instructions 549-1 may be instructions executable to facilitate communication between the VCI 406 and the centralized virtual server application 546 in response to a determination that the hypervisor (e.g., the hypervisor on which the VCI 406 is deployed) is a first-party hypervisor. The second instructions 549-2 may be executable to facilitate communication between the VCI 406 and the centralized virtual server application 546 in response to a determination that the hypervisor is a third-party hypervisor.

Figure 6:
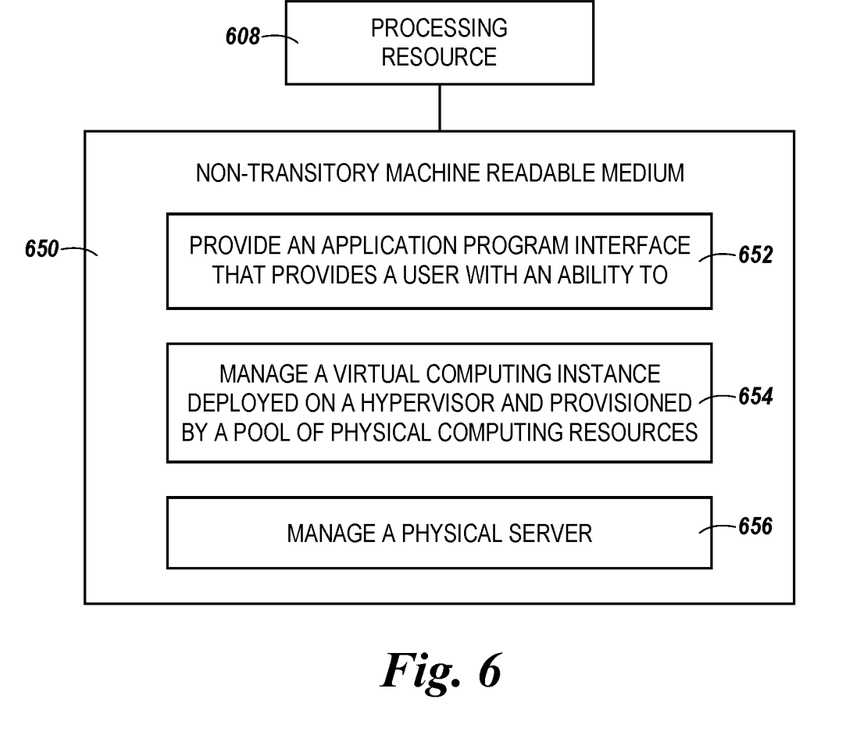
FIG. 6 is a diagram of a non-transitory machine readable medium storing instructions for managing VCIs and physical servers according to the present disclosure.

FIG. 6 is a diagram of a non-transitory machine readable medium 650 storing instructions for managing VCIs and physical servers according to the present disclosure. A processing resource 608 may execute instructions stored on the non-transitory machine readable medium 650. The non-transitory machine readable medium 650 may be any type of volatile or non-volatile memory or storage, such as random access memory (RAM), flash memory, read-only memory (ROM), storage volumes, a hard disk, or a combination thereof In some embodiments, the non-transitory machine readable medium 650 may store instructions 652 executable by the processing resource 608 to provide an application program interface (API) that provides a user with an ability to manage a virtual computing instance (VCI) deployed on a hypervisor and provisioned by a pool of physical computing resources, as shown at block 654, and manage a physical server, as shown at block 656.

In some embodiments, the non-transitory machine readable medium 650 may store instructions executable by the processing resource 608 to manage the physical server regardless of whether the physical server has an operating system installed thereon. The non-transitory machine readable medium 650 may further store instructions executable by the processing resource 608 to provide the API further include instructions to display information regarding management of the VCI and information regarding management of the physical server in a single user interface. In some embodiments, the instructions may be executable by the processing resource 608 to display the physical server as a managed host in a user interface.

The non-transitory machine readable medium 650 may further store instructions executable by the processing resource 608 to restart a different physical server on which the hypervisor is provisioned responsive to a determination that the VCI has failed. This may allow for a failed VCI to be recovered remotely without the need to manually restart the physical server, which may located remote from a user and may be difficult or impossible for a user to restart.

In some embodiments, the non-transitory machine readable medium 650 may further store instructions executable by the processing resource 608 to mount a media image to the physical server. The media image may be an ISO image for example, and may be mounted to the physical server by asserting an IPMI command to the physical server. In addition, in some embodiments, the instructions may be executable by the processing resource to generate a unified set of permissions for managing the VCI and the physical server.

Figure 7:
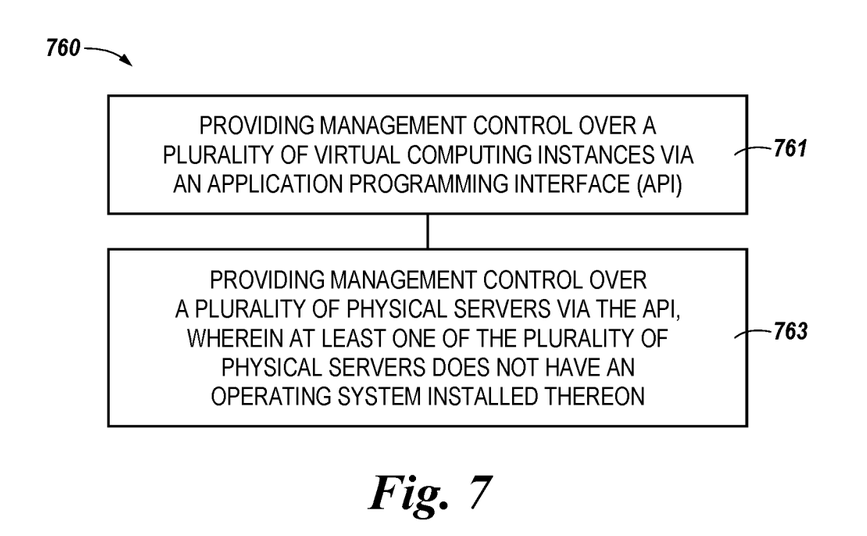
FIG. 7 is a flow diagram illustrating a method for managing VCIs and physical servers according to the present disclosure.

FIG. 7 is a flow diagram illustrating a method 760 for managing VCIs and physical servers according to the present disclosure. At block 761, the method 760 may include providing management control over a plurality of virtual computing instances (VCIs) via an application programming interface (API).

At block 763, the method 760 may include providing management control over a plurality of physical servers via the API. Management control may be provided to the plurality of physical servers via a plurality of IPMIs. In some embodiments, at least one of the plurality of physical servers does not have an operating system installed thereon. Embodiments are not so limited, however, and in some embodiments, at least one of the plurality of physical servers may have a general purpose operating system that has crashed installed thereon, or may have a specialized operating system that has crashed installed thereon.

In some embodiments, the method 760 may include asserting a command via an IPMI to restart a particular one of the plurality of physical servers in response to a determination that a VCI running on the particular one of the plurality of physical servers has failed. This may allow for failed VCIs to be recovered through the API or user interface remotely. In some embodiments, the method 760 may further include asserting a command via an IPMI to mount a media image to a particular one of the plurality of physical servers.

In some embodiments, the method 760 can include displaying information regarding the plurality of VCIs and the plurality of physical servers concurrently via the API. For example, information regarding the plurality of VCIs and the plurality of physical servers can be displayed within a single API or user interface. The method 760 may further include displaying the plurality of physical servers as managed hosts via the API.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory machine-readable medium comprising instructions executable by a processing resource to cause a computing system to at least:
  transmit, via a host gateway, a first virtual computing instance (VCI) instruction to a VCI deployed on a hypervisor;
  in response to a determination that the hypervisor is a third-party hypervisor, provide a translation layer between the VCI and the hypervisor; and
  transmit, via the host gateway, a server instruction to a server, the server instruction translated from a second VCI instruction to manage the server.

2. The non-transitory machine-readable medium of claim 1, wherein the instructions are executable by the processing resource to manage the server regardless of whether the server has an operating system installed thereon.

3. The non-transitory machine-readable medium of claim 1, wherein the instructions are executable by the processing resource to provide the translation layer between the VCI and the hypervisor via an application programming interface (API).

4. The non-transitory machine-readable medium of claim 3, wherein the instructions further include instructions to provide the API to display information regarding management of the VCI and information regarding management of the server in a user interface.

5. The non-transitory machine-readable medium of claim 1, wherein the instructions are executable by the processing resource to restart a different server on which the hypervisor is provisioned responsive to a determination that the VCI has failed.

6. The non-transitory machine-readable medium of claim 1, wherein the instructions are executable by the processing resource to monitor the hypervisor by receiving a heartbeat.

7. The non-transitory machine-readable medium of claim 1, wherein the instructions are executable by the processing resource to generate a unified set of permissions for managing the VCI and the server.

8. The non-transitory machine-readable medium of claim 1, wherein the instructions are executable by the processing resource to provide a user interface in which a console associated with the server and a console associated with the VCI is displayed.

9. A system comprising:
  a server;
  a virtual computing instance (VCI) deployed on a hypervisor;
  a host gateway to, in response to a determination that the hypervisor is a third-party hypervisor, provide a translation layer between the VCI and the hypervisor; and
  a centralized virtual server application to transmit, via the host gateway:
    a first VCI instruction to the VCI to manage the VCI; and
    a server instruction to the server to manage the server, the server instruction translated from a second VCI instruction.

10. The system of claim 9, wherein the centralized virtual server application is configured to present the server as a managed host to the VCI.

11. The system of claim 9, wherein the centralized virtual server application is configured to manage the server via an intelligent platform management interface (IPMI).

12. The system of claim 9, wherein the server has an operating system installed thereon that has crashed.

13. The system of claim 9, wherein the centralized virtual server application includes:
  first instructions executable to facilitate communication between the VCI and the centralized virtual server application in response to a first determination that the hypervisor is a first-party hypervisor; and
  second instructions executable to facilitate communication between the VCI and the centralized virtual server application in response to a second determination that the hypervisor is a third-party hypervisor.

14. The system of claim 9, wherein the centralized virtual server application is configured to restart the server in response to a determination that a management agent associated with the VCI has failed.

15. A method comprising:
  transmitting, via a host gateway, a first VCI instruction to a virtual computing instance (VCI) deployed on a hypervisor;
  in response to a determination that the hypervisor is a third-party hypervisor, providing a translation layer between the VCI and the hypervisor; and
  transmitting, via the host gateway, a server instruction to a server, the server instruction translated from a second VCI instruction to manage the server.

16. The method of claim 15, further including asserting a command via an intelligent platform management interface (IPMI) to restart the server in response to a determination that a second VCI running on the server has failed.

17. The method of claim 15, further including asserting a command via an intelligent platform management interface (IPMI) to mount a media image to the server.

18. The method of claim 15, further including displaying information regarding the VCI and the server concurrently via an application programming interface (API).

19. The method of claim 15, further including displaying the server as a managed host via an application programming interface (API).

20. The method of claim 15, further including managing the server including an operating system installed thereon that has crashed.

* * * * *